(12) United States Patent
Matsui et al.

(10) Patent No.: US 9,691,255 B2
(45) Date of Patent: Jun. 27, 2017

(54) CONTROL DEVICE, AND CONTROL SYSTEM

(71) Applicant: Oki Electric Industry Co., Ltd., Tokyo (JP)

(72) Inventors: Michiyo Matsui, Tokyo (JP); Kurato Maeno, Tokyo (JP); Takashi Hashimoto, Tokyo (JP); Motoko Kagaya, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 318 days.

(21) Appl. No.: 14/532,173

(22) Filed: Nov. 4, 2014

(65) Prior Publication Data

US 2015/0154849 A1   Jun. 4, 2015

(30) Foreign Application Priority Data

Dec. 4, 2013   (JP) ................................. 2013-251155

(51) Int. Cl.
| | |
|---|---|
| *G01S 13/04* | (2006.01) |
| *G08B 21/22* | (2006.01) |
| *G01S 13/86* | (2006.01) |
| *G01S 17/02* | (2006.01) |
| *G01S 13/56* | (2006.01) |
| *G01S 15/52* | (2006.01) |
| *G08B 13/24* | (2006.01) |

(52) U.S. Cl.
CPC ............ *G08B 21/22* (2013.01); *G01S 13/56* (2013.01); *G01S 13/86* (2013.01); *G01S 15/523* (2013.01); *G01S 17/026* (2013.01); *G08B 13/2494* (2013.01)

(58) Field of Classification Search
CPC ............................... G08B 21/22; G01S 13/56
USPC .............................................. 342/22, 27, 28
See application file for complete search history.

(56) References Cited

U.S. PATENT DOCUMENTS

| | | | | |
|---|---|---|---|---|
| 4,882,567 A | * | 11/1989 | Johnson ................. | G08B 13/19 340/522 |
| 5,459,657 A | * | 10/1995 | Wynn ................... | G06Q 10/109 705/32 |

(Continued)

FOREIGN PATENT DOCUMENTS

| | | |
|---|---|---|
| JP | H08-329358 A | 12/1996 |
| JP | 2005-004256 A | 1/2005 |

*Primary Examiner* — Marcus Windrich
(74) *Attorney, Agent, or Firm* — Rabin & Berdo, P.C.

(57) ABSTRACT

To improve the accuracy of the determination on whether or not a moving object is present in a predetermined region, a control device for use in a system configured to conduct presence-or-absence determination on whether or not a moving object is present on the basis of detection by a first sensor provided in a predetermined compartment region, the control device comprising: a mode control section configured to control switching of an operation mode for the detection by the first sensor or the presence-or-absence determination; and an acquisition section configured to acquire a determination result of whether or not a moving object is present in an adjacent region adjacent to the predetermined compartment region and not including the predetermined compartment region; wherein the mode control section controls the switching of the operation mode in response to the determination result acquired by the acquisition section, is provided.

18 Claims, 15 Drawing Sheets

(56) References Cited

U.S. PATENT DOCUMENTS

| | | | | |
|---|---|---|---|---|
| 5,576,972 | A * | 11/1996 | Harrison | G01S 13/04 702/128 |
| 6,177,903 | B1 * | 1/2001 | Fullerton | G01S 7/003 342/21 |
| 6,307,475 | B1 * | 10/2001 | Kelley | G01S 13/56 340/506 |
| 7,342,493 | B2 * | 3/2008 | Johnson | G01S 13/0209 340/539.16 |
| 7,884,727 | B2 * | 2/2011 | Tran | A61B 5/0006 307/117 |
| 8,432,277 | B2 * | 4/2013 | Egawa | G08B 3/10 340/540 |
| 2008/0165046 | A1 * | 7/2008 | Fullerton | G01S 7/003 342/21 |
| 2010/0045457 | A1 * | 2/2010 | Krill | G08B 29/188 340/539.22 |
| 2012/0182172 | A1 * | 7/2012 | Sorensen | H04W 64/00 342/28 |
| 2013/0002434 | A1 * | 1/2013 | Cuddihy | G08B 21/043 340/573.7 |
| 2013/0335219 | A1 * | 12/2013 | Malkowski | G08B 13/22 340/539.22 |
| 2014/0361920 | A1 * | 12/2014 | Katuri | G01S 13/04 342/28 |

* cited by examiner

FIG. 7

PRESENCE-IN-ROOM SITUATION CONFIRMATION SCREEN IMAGE

| ROOM ID | X | Y | ... |
|---|---|---|---|
| DETERMINATION RESULT | EMPTY | RESTING | ... |
| OPERATION MODE | SENSITIVITY ADJUSTING MODE | NORMAL MODE | ... |
| SWITCH STATE | PRESENT IN ROOM | PRESENT IN ROOM | |

ATTENTION !
TROUBLE MAY BE OCCURRING IN ROOM X !

ACTING OR RESTING IS 1 OR MORE → 1 OR MORE STATUSES
ACTING OR RESTING IS LESS THAN 1 → EMPTY

NORMAL MODE

| SENSOR | SENSOR 12A | SENSOR 12B | SENSOR 12C |
|---|---|---|---|
| DETERMINATION RESULT | EMPTY | EMPTY | ACTING |
| WEIGHT | 1 | 1 | 1 |

EMPTY SCORE: 2
ACTING SCORE: 1
DETERMINATION RESULT: ACTING

SENSITIVITY ADJUSTING MODE

| SENSOR | SENSOR 12A | SENSOR 12B | SENSOR 12C |
|---|---|---|---|
| DETERMINATION RESULT | EMPTY | EMPTY | ACTING |
| WEIGHT | 1 | 0.8 | 0.3 |

EMPTY SCORE: 1.8
ACTING SCORE: 0.3
DETERMINATION RESULT: EMPTY

CONTROL DEVICE, AND CONTROL SYSTEM

CROSS REFERENCE TO RELATED APPLICATION(S)

This application is based upon and claims benefit of priority from Japanese Patent Application No. 2013-251155, filed on Dec. 4, 2013, the entire contents of which are incorporated herein by reference.

BACKGROUND

The present invention relates to a control device and a control system.

In recent days, sensors for detecting the presence of a moving object including a human being, animals and living things are widely prevalent. The moving objects include not only things to change from place or position but also body parts, a chest or shoulders, to slightly change by breathing. This kind of sensors include an infrared sensor, an ultrasonic sensor, a visible light sensor, and the like. Also, a Doppler sensor that generates a Doppler signal on the basis of a transmitted wave and a received wave including a reflected wave of the transmitted wave is attracting attention as well. The presence and the situation of the moving object are able to be determined by analyzing the Doppler signal generated by the Doppler sensor.

As a system using a sensor for determining the presence or the situation of a moving object, JP 2005-4256A discloses, for example, a monitoring system that starts behavior monitoring of a human being in a bathroom on the basis of the Doppler signal generated by a Doppler sensor, when an entrance into the bathroom is sensed. Also, JP H08-329358A discloses a monitoring system that is provided with a pyroelectric sensor and a Doppler sensor for a same monitoring region, and starts monitoring of the monitoring region by the Doppler sensor when a human being is sensed in the monitoring region by the pyroelectric sensor.

SUMMARY

The monitoring systems described above are both a system that controls the execution of the monitoring by a Doppler sensor, on the basis of the sensing result of a human being in the same region as the Doppler sensor.

However, it is envisaged that the result of the detection by a sensor such as a Doppler sensor is affected by the moving object present around the originally intended region. For this reason, it is concerned that a wrong determination result is obtained in the determination of the presence or absence of a moving object, which is conducted on the basis of the detection of the sensor.

Therefore, it is desired to improve the accuracy of the determination on whether or not a moving object is present in a predetermined region.

According to an aspect of the present invention, there is provided a control device for use in a system configured to conduct presence-or-absence determination on whether or not a moving object is present on the basis of detection by a first sensor provided in a predetermined compartment region, the control device including, a mode control section configured to control switching of an operation mode for the detection by the first sensor or the presence-or-absence determination, and an acquisition section configured to acquire a determination result of whether or not a moving object is present in an adjacent region adjacent to the predetermined compartment region and not including the predetermined compartment region. The mode control section controls the switching of the operation mode in response to the determination result acquired by the acquisition section.

The first sensor may be a Doppler sensor configured to generate a Doppler signal on the basis of a transmitted wave and a received wave including a reflected wave of the transmitted wave.

the mode control section may switch the operation mode to a first operation mode when a determination result indicating that a moving object is not present in the adjacent region is acquired by the acquisition section, and switch the operation mode to a second operation mode when a determination result indicating that a moving object is present in the adjacent region is acquired, and in the second operation mode, a situation in which a determination result indicating that a moving object is present is obtained in the presence-or-absence determination may be more limited than in the first operation mode.

The detection by the first sensor may be stopped in the second operation mode.

A scope of detection by the first sensor may be reduced in the second operation mode.

In the second operation mode, a direction of detection by the first sensor may be changed to an opposite side from the adjacent region.

The presence-or-absence determination may be conducted by comparing a value obtained on the basis of the detection by the first sensor and a threshold value, and a different value may be applied as the threshold value in the first operation mode from in the second operation mode.

A plurality of first sensors may be provided in the predetermined compartment region, and the control device may further comprise a determination section configured to determine whether or not a moving object is present on the basis of the detection by the first sensors, and the determination section may conduct determination on whether or not a moving object is present by using each detection by the first sensors with a weight according to the determination result acquired by the acquisition section.

The acquisition section may determine whether or not a moving object is present in the adjacent region on the basis of a detection result by a second sensor of which a scope of detection includes the adjacent region.

The second sensor may be a human-sensing sensor.

The second sensor may be an image sensor.

The second sensor may be a human-operated switch sensor provided for the predetermined compartment region.

The adjacent region may be a region that a human being steps in when patrolling the predetermined compartment region, and the acquisition section may determine whether or not a human being, which is a moving object, is present in the adjacent region, on the basis of a preset patrol schedule of a human being.

The control device may further include a display control section configured to cause a display section to display a determination result of whether or not a moving object is present, obtained on the basis of the detection by the first sensor.

The display control section may cause the display section to further display information indicating in which operation mode the determination result based on the detection by the first sensor is obtained.

The control device may further include a storage section configured to store a history of the determination result based on the detection by the first sensor.

The moving object may be a human being.

According to other aspect of the present invention, there is provided a control system configured to conduct presence-or-absence determination on whether or not a moving object is present on the basis of detection by a first sensor provided in a predetermined compartment region, the control system including, the first sensor, a second sensor of which a scope of detection includes an adjacent region adjacent to the predetermined compartment region and not including the predetermined compartment region, and a control device including a mode control section configured to control switching of an operation mode for the detection by the first sensor or the presence-or-absence determination, and an acquisition section configured to acquire a determination result of whether or not a moving object is present in the adjacent region on the basis of communication with the second sensor. The mode control section controls the switching of the operation mode in response to the determination result acquired by the acquisition section.

According to other aspect of the present invention, there is provided a program for causing a computer to operate as a control device for use in a system configured to conduct presence-or-absence determination on whether or not a moving object is present on the basis of detection by a first sensor provided in a predetermined compartment region. The control device includes a mode control section configured to control switching of an operation mode for the detection by the first sensor or the presence-or-absence determination, and an acquisition section configured to acquire a determination result of whether or not a moving object is present in an adjacent region adjacent to the predetermined compartment region and not including the predetermined compartment region. The mode control section controls the switching of the operation mode in response to the determination result acquired by the acquisition section.

As described above, according to the present invention, the accuracy of the determination on whether or not a moving object is present in a predetermined region is improved.

BRIEF DESCRIPTION OF THE DRAWINGS

FIG. 7 is an explanatory diagram illustrating a specific example of a presence-in-room situation confirmation screen image;

FIG. 14 is an explanatory diagram illustrating an example of a normal mode and a sensitivity adjusting mode.

DETAILED DESCRIPTION OF THE EMBODIMENT(S)

Figure 1:
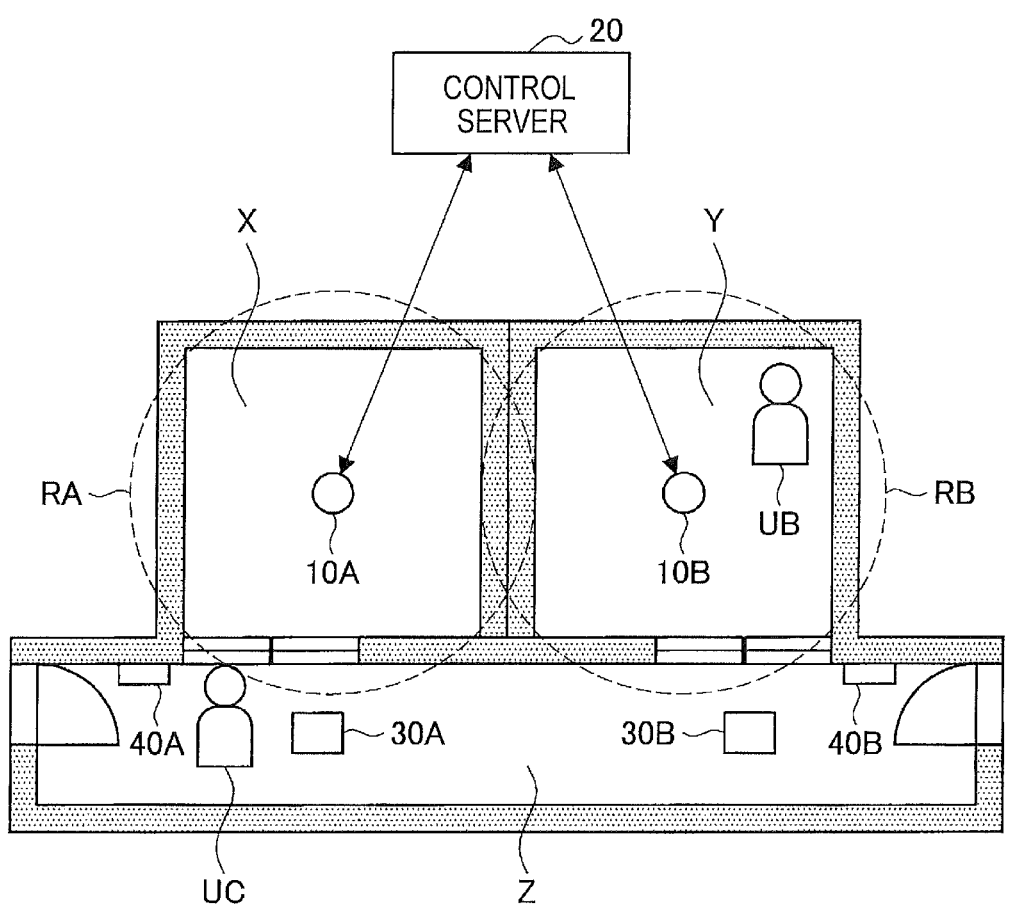
FIG. 1 is an explanatory diagram illustrating a basic configuration of a control system according to a first embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Also, in the present specification and drawings, a plurality of structural elements that have substantially the same function and structure are sometimes distinguished by adding different alphabets after a same reference numeral. For example, a plurality of configurations that have substantially the same function and structure or logical significance are distinguished as necessary, like Doppler sensors 10A and 10B. However, when a plurality of structural elements that have substantially the same function and structure are needless to be distinguished from each other, only the same reference sign is assigned. For example, when the Doppler sensors 10A and 10B are needless to be distinguished, simply the Doppler sensor 10 is referred.

1. First Embodiment

<1-1. Overview of Control System According to First Embodiment>

First, with reference to FIG. 1, description will be made of a basic configuration of a control system according to the first embodiment of the present invention.

FIG. 1 is an explanatory diagram illustrating the basic configuration of the control system according to the first embodiment of the present invention. As illustrated in FIG. 1, the control system according to the first embodiment of the present invention includes Doppler sensors 10A and 10B, a control server 20, human-sensing sensors 30A and 30B, and state operation panels 40A and 40B.

The Doppler sensor 10 (the first sensor) is provided in a compartment region corresponding to one compartment of a building. For example, as illustrated in FIG. 1, the Doppler sensor 10A is provided in the compartment region "room X" of the building, and the Doppler sensor 10B is provided in the compartment region "room Y".

This Doppler sensor 10 transmits light, electromagnetic wave, sound wave or the like as a transmitted wave, and receives a reflected wave from a moving object that is present in the scope of detection, and determines the presence or absence of a moving object and the state of a moving object on the basis of the result of the reception. For example, since the scope RB of detection by the Doppler sensor 10B includes the "room Y", the Doppler sensor 10B can determine that a human being UB is present in the "room Y". Further, the Doppler sensor 10B can determine whether the human being UB is in an "acting" state or in a "resting" state. The "resting" state includes a state in which a human being is only breathing without actively moving (for example, a state sitting on a chair or a floorboard, a standing state, a lying state, and the like). The "acting" state includes a state in which a human being is actively moving, for example by moving limbs (walking, stepping, and the like).

Although in the present specification the description will be made with a human being as one example of the moving object, the moving object may be an animal other than the human being, or another object such as an artificial structure that moves. Also, the compartment region is a compartment in which a region is sectioned by walls, partitions, fences, and the like, and the "room" is just one example of the compartment region. For example, each floor of the building can be considered as corresponding to one compartment region. Further, the building may be an artificial structure such as a medical facility, a nursing-care facility, a childcare facility, an amusement attraction facility, a prison facility, a hotel, an apartment building, a commercial building, a high-speed train, or a vessel.

The human-sensing sensor 30 is provided to determine whether or not a moving object is present in the adjacent region which is adjacent to the compartment region in which the Doppler sensor 10 is provided and which does not include the aforementioned predetermined compartment region. For example, as illustrated in FIG. 1, the human-sensing sensor 30A and the human-sensing sensor 30B are provided in a "passageway Z" adjacent to the "room X" and the "room Y", and the human-sensing sensor 30A can determine that a human being UC is present in the passageway Z in front of the "room X". Note that, if the human-sensing sensor 30 can determine the presence or absence of a moving object in the adjacent region, not affected by the presence or absence of a moving object in the compartment region, the human-sensing sensor 30 may be an infrared sensor, an ultrasonic sensor, or a visible light sensor, or may be a Doppler sensor. Also, the compartment region can be defined as a space which is defined by a specific "room", a compartment, or the like and which the determination of the presence or absence of a moving object is desired for. However, the adjacent region need not be defined by the structure of the facility such as a "room", a "passageway", or a compartment, but can be set as appropriate by the scope adjacent to the compartment region and not including the compartment region, with consideration of the detection capability of the Doppler sensor 10. For example, the adjacent region to determine whether or not a moving object is present with the above human-sensing sensor 30A may be the whole "passageway Z", or may be a part of the "passageway Z" adjacent to the "room X".

The state operation panel 40 is the operation panel provided for each compartment region. A switch sensor, which is human-operated to indicate the state of the human being corresponding to each compartment region, is provided in this state operation panel 40. For example, a switch sensor for switching between a plurality of states, such as present in room, out of room, and in meeting, can be provided in the state operation panel 40A and the state operation panel 40B.

The control server 20 is an example of the control device for controlling the operation of the control system according to the present embodiment, and communicates with the Doppler sensor 10, the human-sensing sensor 30, and the state operation panel 40. For example, the control server 20 receives the determination result of whether or not a human being is present in the "passageway Z" from the human-sensing sensor 30, and receives the state information of each compartment region from the state operation panel 40, and receives the determination result of the presence or absence and the state of a human being in each compartment region from the Doppler sensor 10. Also, the control server 20 controls the switching of the operation mode for the presence-or-absence determination by the Doppler sensor 10. In the following, description will be made of the background to reach the switching control of the operation mode, and the overview of the operation mode.

(Background)

The determination result desired to be obtained by the Doppler sensor 10 is the determination result of the presence or absence and the state of a human being in the compartment region in which the Doppler sensor 10 is provided. However, it is envisaged that the determination result obtained by the Doppler sensor 10 is affected by the human being present around the compartment region in which the Doppler sensor 10 is provided. For example, as illustrated in FIG. 1, if the attachment position and the sensitivity of the Doppler sensor 10A are adjusted in such a manner to conduct determination in the entire "room X" which is the compartment region, the scope RA of detection by the Doppler sensor 10A provided in the "room X" reaches the "passageway Z" outside the "room X". For this reason, when the human being UC is present in the "passageway Z" as illustrated in FIG. 1, the Doppler sensor 10 will, in some cases, determine that a human being is present, even though a human being is not present in the "room X". On the other hand, when the scope of detection is set narrow fixedly in such a manner that the scope RA of detection by the Doppler sensor 10A does not reach the "passageway Z", it is concerned that the region not included in the scope of detection is created in the "room X".

Therefore, the control server 20 switches the operation mode for the presence-or-absence determination by the Doppler sensor 10, on the basis of the determination result received from the human-sensing sensor 30. Specifically, the control server 20 operates the Doppler sensor 10A in the normal mode (the first operation mode), when receiving the determination result indicating that a human being is not present in the "passageway Z" from the human-sensing sensor 30A, and operates the Doppler sensor 10A in the sensitivity adjusting mode (the second operation mode), when receiving the determination result indicating that a human being is present in the "passageway Z" from the human-sensing sensor 30A. Here, the situation that results in the determination result indicating that a human being is present in the presence-or-absence determination by the Doppler sensor 10 is more limited in the sensitivity adjusting mode, than in the normal mode. According to such a configuration, in the situation in which the "room X" is empty and the human being UC is present in front of the "room X" as illustrated in FIG. 1 for example, the Doppler sensor 10A operates in the sensitivity adjusting mode, in order to reduce the cases in which the determination result indicating that a human being is present is obtained by mistake.

(Specific Use Case)

The first embodiment of the present invention described above is applicable to a medical facility, for example. For comparison, first, description will be made of the operation of a case in which the Doppler sensor according to a comparative example against the present invention is applied to a medical facility. When a patient in a hospital room goes into a cardio-respiratory arrest state by sudden deterioration, the Doppler sensor according to the comparative example against the present invention stops detecting the presence of the patient, but can determine that a human being is present when another patient or a medical facility worker is present in front of the hospital room. For this reason, it is concerned that the medical facility worker belatedly notices the sudden deterioration of the patient.

In contrast, when another patient or a medical facility worker is present in front of the hospital room, the Doppler sensor 10 according to the first embodiment of the present invention operates in the sensitivity adjusting mode, in order to more accurately determine the state of the patient in the hospital room. For this reason, the sudden deterioration of the patient is found promptly.

Also, the first embodiment of the present invention is applicable to the no-go area of various types of facilities. For example, the Doppler sensor 10 according to the first embodiment of the present invention is provided in the no-go area of various types of facilities, and the human-sensing sensor 30 is provided in the adjacent region of the no-go area, so that the Doppler sensor 10 is operable in the sensitivity adjusting mode when a human being is present in the adjacent region. This prevents the wrong determination that a human being is present in the no-go area, even though a human being is not present in the no-go area, due to the influence of a human being present in the adjacent region.
<1-2. Configuration of Doppler Sensor According to First Embodiment>

In the above, the overview of the control system according to the first embodiment has been described. Subsequently, with reference to FIG. 2, the configuration of the Doppler sensor 10 according to the first embodiment will be described.

Figure 2:
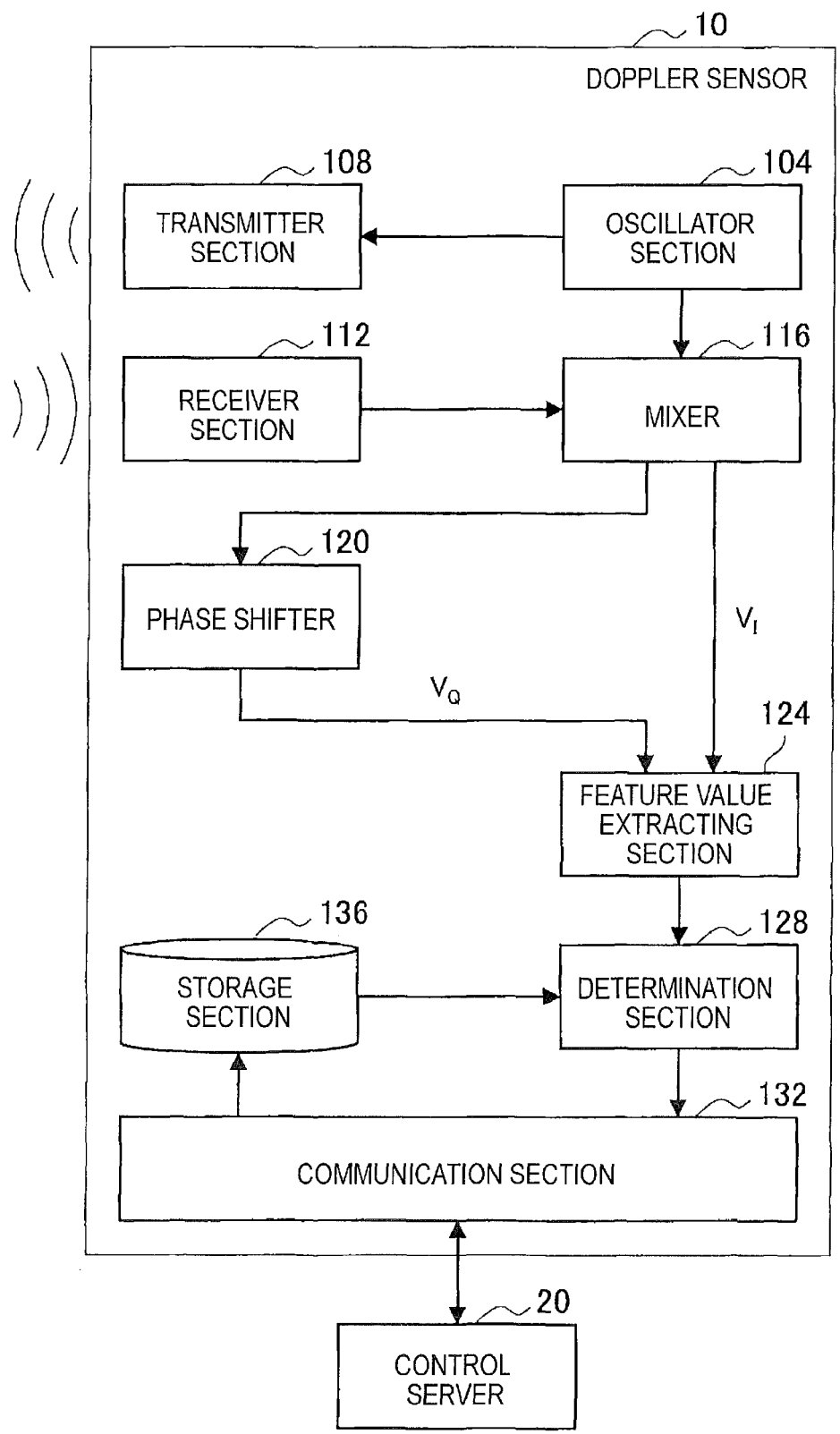
FIG. 2 is a functional block diagram illustrating a configuration of a Doppler sensor 10 according to a first embodiment.

FIG. 2 is a functional block diagram illustrating the configuration of the Doppler sensor 10 according to the first embodiment. As illustrated in FIG. 2, the Doppler sensor 10 according to the first embodiment includes an oscillator section 104, a transmitter section 108, a receiver section 112, a mixer 116, a phase shifter 120, a feature value extracting section 124, a determination section 128, a communication section 132, and a storage section 136.
(Oscillator Section)

The oscillator section 104 generates a cycle signal of a transmitted wave to be transmitted by the transmitter section 108. The cycle signal generated by the oscillator section 104 is output to the transmitter section 108 and the mixer 116.
(Transmitter Section, Receiver Section)

The transmitter section 108 is an antenna to transmit to the outside, the cycle signal output from the oscillator section 104 as the transmitted wave, by light, electromagnetic wave, sound wave, or the like. The receiver section 112 is an antenna to receive a reflected wave of the transmitted wave transmitted from the transmitter section 108. The received wave including the reflected wave received by the receiver section 112 is output to the mixer 116. Note that, in the present specification, a series of processes in which the transmitter section 108 transmits the transmitted wave and the receiver section 112 receives the reflected wave is sometimes referred to as detection.
(Mixer)

The mixer 116 generates a Doppler signal, which is a complex signal, by mixing the cycle signal output from the oscillator section 104 and the received wave output from the receiver section 112. Here, it is known that the frequency of the received wave varies in proportion to the velocity of the movement of a human being present in the scope of detection. Also, by mixing the received wave and the cycle signal, the Doppler signal having a frequency identical with the frequency difference between the received wave and the cycle signal is generated. For this reason, the frequency of the Doppler signal indicates the velocity of the movement of a human being present in the scope of detection.
(Phase Shifter)

The phase shifter 120 delays the phase of the Doppler signal generated by the mixer 116 by 90 degrees. The Doppler signal the phase of which is delayed by the phase shifter 120 is output to the feature value extracting section 124 as the signal $V_Q$. Also, the Doppler signal generated by the mixer 116 and having the phase 90 degrees different from the signal $V_Q$ is output to the feature value extracting section 124 as the signal $V_I$. Note that I of the subscript represents In-phase, and Q represents Quadrature. Also, the configuration of the functional block for executing the filter process is omitted in FIG. 2, but the filter process may be conducted on each signal as appropriate.
(Feature Value Extracting Section)

The feature value extracting section 124 extracts a feature value from the signal $V_I$ and the signal $V_Q$ which are input. In the following, as a specific example of the feature value, description will be made of the process to extract the average amplitude E(v) and the dominant frequency.

The feature value extracting section 124 extracts an average amplitude E(v) during a unit period (for example, one second), in accordance with below formula 1.

$$v(m) = \sqrt{v_{IAC}^2(m) + v_{QAC}^2(m)} \qquad \text{Formula 1}$$

$$E(v) = \frac{1}{M}\sum_{m=1}^{M} v(m)$$

In above formula 1, $V_{IAC}(m)$ is the alternate current component of the signal $V_I$, and $V_{QAC}(m)$ is the alternate current component of the signal $V_Q$, and m is the index of time-series data, and M is the sample number (for example, 500) per a unit period.

Figure 3:
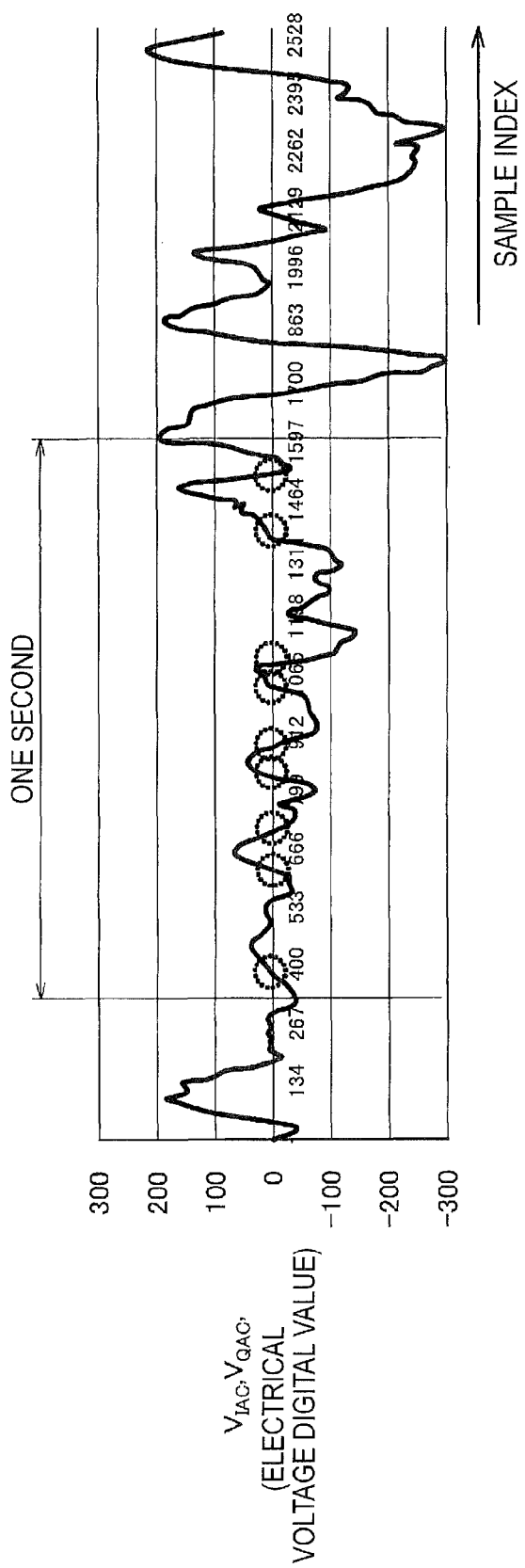
FIG. 3 is an explanatory diagram illustrating a calculation process of a dominant frequency.

Also, for the extraction of the dominant frequency, the feature value extracting section 124 first counts the zero crossing point number during a unit period for each of the signal $V_I$ and the signal $V_Q$. The zero crossing point number is the number of times in which the signal $V_I$ or the signal $V_Q$ intersects 0 value, as illustrated in the circles in FIG. 3. Specifically, the feature value extracting section 124 increments zero crossing point number, for each of the signal $V_I$ and the signal $V_Q$, when the below condition is satisfied.

$V_{IAC}(m) \times V_{IAC}(m+1) < 0.0$    The signal $V_I$:

$V_{QAC}(m) \times V_{QAC}(m+1) < 0.0$    The signal $V_Q$:

Then, the feature value extracting section 124 extracts the dominant frequency by adding the zero crossing point number of the signal $V_I$ and the zero crossing point number of the signal $V_Q$.
(Determination Section)

The determination section 128 determines the presence or absence and the state of a human being in a predetermined compartment region provided with the Doppler sensor 10, on the basis of the feature value extracted by the feature value extracting section 124. For example, the determination section 128 executes the above determination by comparing the average amplitude E(v) and the dominant frequency extracted by the feature value extracting section 124, with the threshold values stored in the storage section 136. In the following, this point will be described specifically with reference to FIG. 4.

Figure 4:
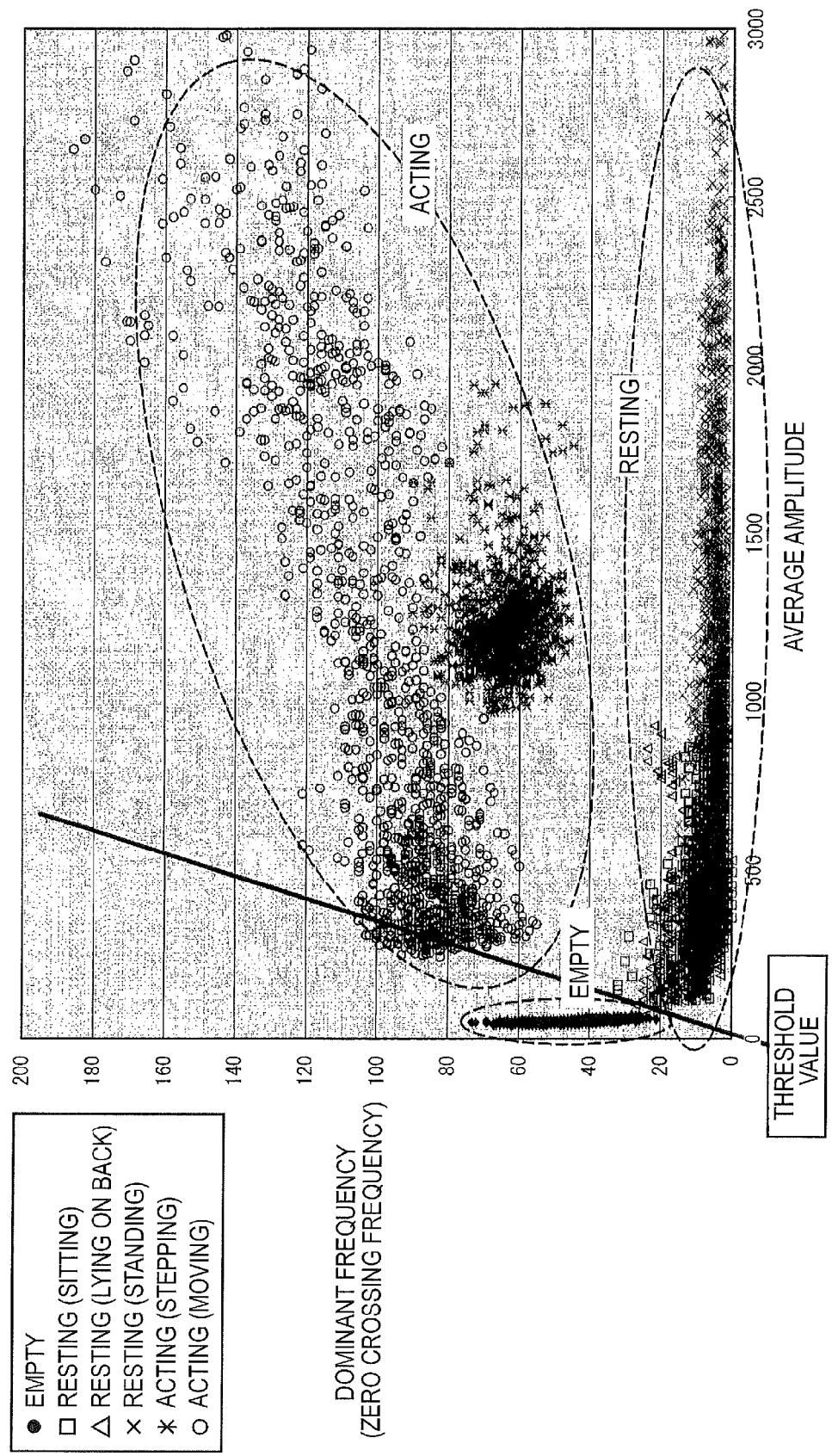
FIG. 4 is an explanatory diagram illustrating a relationship between an average amplitude and a dominant frequency in a state of a human being.

FIG. 4 is an explanatory scatter plot illustrating distribution of the average amplitude and dominant frequency and the state of a human being. As illustrated in FIG. 4, the dominant frequency is relatively low in the "resting" state than in the "acting" state, and the average amplitude tends to be low in the "empty" state than in the "acting" state and the "resting" state. On the basis of the tendency like this, for example as illustrated in FIG. 4, the value on the dominant frequency axis in relation to the average amplitude is used as the threshold value for distinguishing the "empty" state from other states. In the example illustrated in FIG. 4, the determination section 128 determines that a predetermined compartment region is in the "empty" state when the dominant frequency is above the threshold value, and determines that a predetermined compartment region is the "acting" state or the "resting" state when the dominant frequency is below the threshold value.

(Communication Section)

The communication section 132 transmits to and receives from the control server 20 various types of information. For example, the communication section 132 transmits the determination result by the determination section 128, to the control server 20. Also, the communication section 132 receives the transition instruction to the normal mode or the sensitivity adjusting mode, from the control server 20. The transition instruction to each operation mode may include the information of the threshold value used in the determination by the determination section 128. The information of this threshold value is stored in the storage section 136, and the threshold value used in the determination by the determination section 128 varies in order to switch the operation mode. Alternatively, when the storage section 136 stores beforehand the threshold value for the normal mode and the threshold value for the sensitivity adjusting mode, the determination section 128 switches the threshold value used in the determination on the basis of the transition instruction from the control server 20, in order to switch the operation mode. Note that the relationship between the threshold value for the normal mode and the threshold value for the sensitivity adjusting mode will be described later with reference to FIG. 6.

(Storage Section)

The storage section 136 stores the information of the threshold value used in the determination by the determination section 128. For example, the storage section 136 may store both of the threshold value for the normal mode and the threshold value for the sensitivity adjusting mode, and the information indicating the current operation mode instructed from the control server 20. Alternatively, the storage section 136 may store only the information of the threshold value for the current operation mode instructed from the control server 20, among the threshold value for the normal mode and the threshold value for the sensitivity adjusting mode.

<1-3. Configuration of Control Server According to First Embodiment>

In the above, the configuration of the Doppler sensor 10 according to the first embodiment has been described. Subsequently, with reference to FIG. 5, the configuration of the control server 20 according to the first embodiment will be described.

Figure 5:
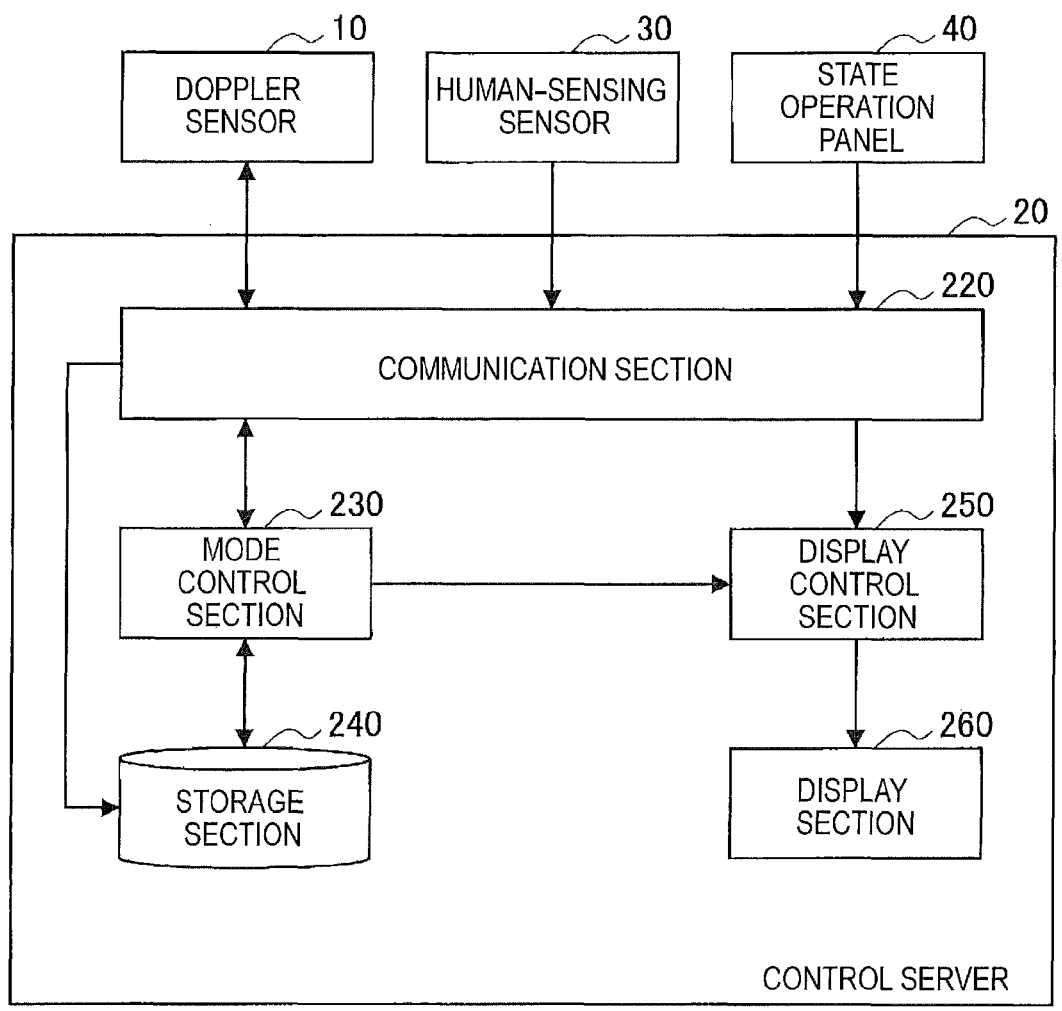
FIG. 5 is a functional block diagram illustrating a configuration of a control server 20 according to a first embodiment.

FIG. 5 is a functional block diagram illustrating the configuration of the control server 20 according to the first embodiment. As illustrated in FIG. 5, the control server 20 according to the first embodiment includes a communication section 220, a mode control section 230, a storage section 240, a display control section 250, and a display section 260.

(Communication Section)

The communication section 220 transmits to and receives from the Doppler sensor 10, the human-sensing sensor 30, and the state operation panel 40, various types of information. For example, the communication section 220 receives the state information of each compartment region from the state operation panel 40, which is set by a human. Also, the communication section 220 serves as an acquisition section configured to acquire, from the human-sensing sensor 30, the determination result of the presence or absence of a human being in the adjacent region of a predetermined compartment region provided with the Doppler sensor 10.

Also, the communication section 220 transmits, to the Doppler sensor 10, the transition instruction to the normal mode or the sensitivity adjusting mode, as the switching instruction of the operation mode, in accordance with the control by the mode control section 230. Also, the communication section 220 receives the determination result of the presence or absence and the state of a human being in a predetermined compartment region, from the Doppler sensor 10.

Note that the communication between the communication section 220 and each of the Doppler sensor 10, the human-sensing sensor 30, and the state operation panel 40 may be conducted through a wire, or may be conducted wirelessly, or may be conducted through a network.

(Mode Control Section)

The mode control section 230 controls the operation mode of the Doppler sensor 10, on the basis of the determination result of the adjacent region received from the human-sensing sensor 30 by the communication section 220. For example, when receiving the determination result indicating that a human being is not present in the "passageway Z" from the human-sensing sensor 30A illustrated in FIG. 1, the mode control section 230 causes the communication section 220 to transmit the transition instruction to the normal mode to the Doppler sensor 10A. On the other hand, when receiving the determination result indicating that a human being is present in the "passageway Z" from the human-sensing sensor 30A, the mode control section 230 causes the communication section 220 to transmit the transition instruction to the sensitivity adjusting mode to the Doppler sensor 10A.

Here, in the presence-or-absence determination by the Doppler sensor 10, the situation that results in the determination result indicating that a human being is present ("acting" or "resting") is more limited in the sensitivity adjusting mode, than in the normal mode. For example, the limitation is realized by applying different threshold values in the sensitivity adjusting mode and the normal mode for the determination by the Doppler sensor 10. In the following, this point will be described specifically with reference to FIG. 6.

Figure 6:
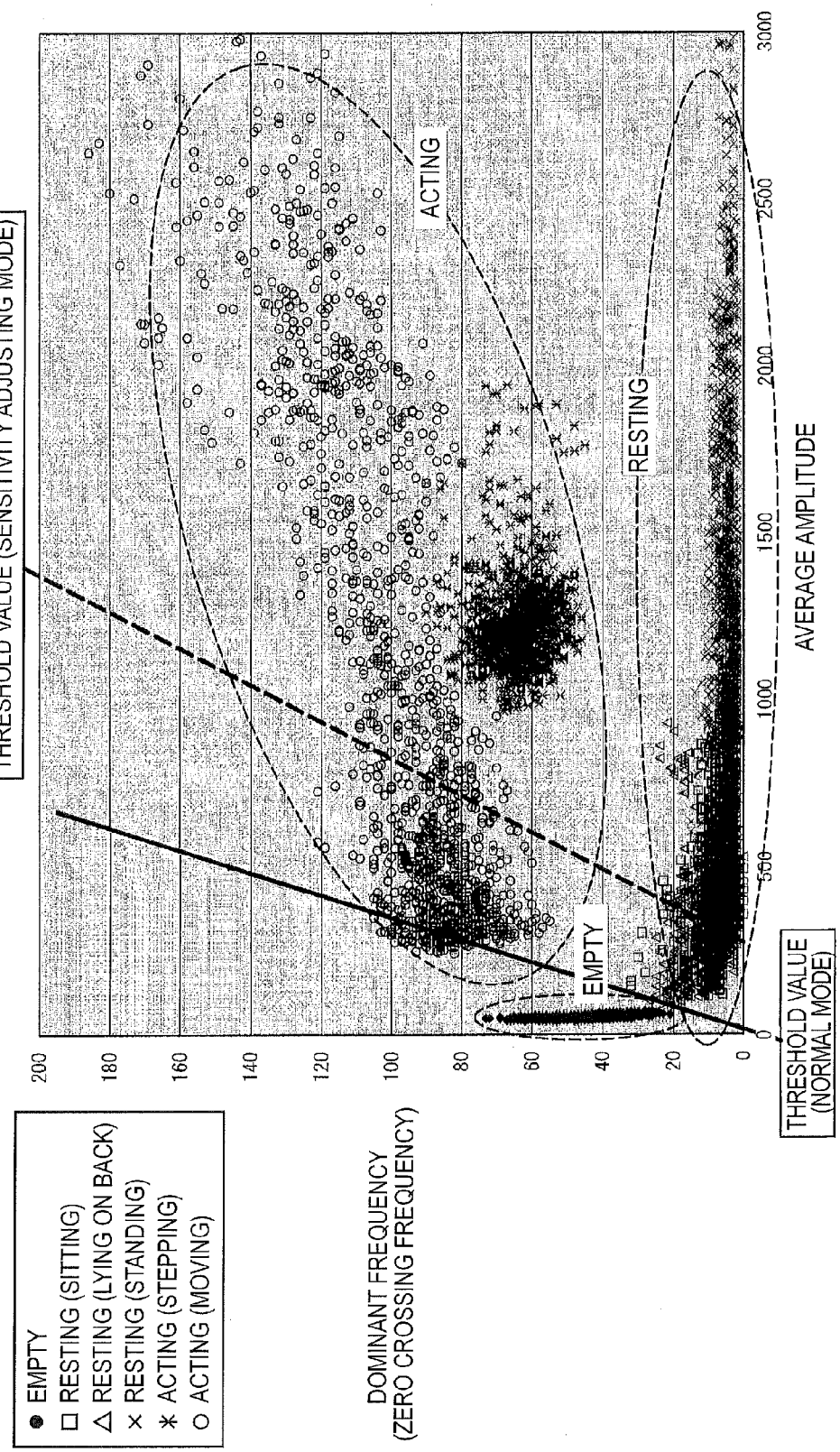
FIG. 6 is an explanatory diagram illustrating a relationship between a threshold value for a normal mode and a threshold value for a sensitivity adjusting mode.

FIG. 6 is an explanatory scatter plot illustrating distribution of the threshold value for the normal mode and the threshold value for the sensitivity adjusting mode. The threshold value for the sensitivity adjusting mode, in other words the threshold value to distinguish the "empty" state from the "acting" state or the "resting" state, is expressed by the straight line shown with the dashed line in FIG. 6 for example. The scope of the average amplitude and the dominant frequency in which the "empty" state is determined by the threshold value for the sensitivity adjusting mode is wider than the normal mode, and the scope of the average amplitude and the dominant frequency in which the "acting" or "resting" state is determined is narrower than the normal mode. Accordingly, as above, the situation that results in the determination result indicating that a human being is present ("acting" or "resting") in the presence-or-absence determination by the Doppler sensor 10 is more limited in the sensitivity adjusting mode, than in the normal mode.

Note that the correspondence relationship between the Doppler sensor 10 and the human-sensing sensor 30 is stored in the storage section 240, and the mode control section 230 may control the operation mode of each Doppler sensor on the basis of the correspondence relationship stored beforehand. For example, when the correspondence of the human-sensing sensor 30A and the Doppler sensor 10A is stored in the storage section 240, the mode control section 230 may control the operation mode of the Doppler sensor 10A on the basis of the determination result by the human-sensing sensor 30A, by referring to the storage section 240.

(Storage Section)

The storage section 240 stores various types of information used in the operation of the control server 20. For example, the storage section 240 may store the threshold value for the normal mode and the threshold value for the sensitivity adjusting mode. Also, the storage section 240 may store the correspondence relationship between the Doppler sensor 10 and the human-sensing sensor 30. Further, the storage section 240 may store the determination result by the Doppler sensor 10 and the history of the operation mode. By storing the history, the post hoc analysis relevant to the correctness of the control executed by the control server 20 can be conducted.

(Display Control Section, Display Section)

The display control section 250 controls the display displayed by the display section 260. For example, the display control section 250 generates a presence-in-room situation confirmation screen image presenting the presence-in-room situation of each compartment region, on the basis of the information received from the Doppler sensor 10, the state operation panel 40, and the like, and causes the display section 260 to display the presence-in-room situation confirmation screen image. In the following, with reference to FIG. 7, the presence-in-room situation confirmation screen image will be described more specifically.

FIG. 7 is an explanatory diagram illustrating a specific example of the presence-in-room situation confirmation screen image. As illustrated in FIG. 7, in the presence-in-room situation confirmation screen image, the determination result of the state of a human being, the operation mode of the Doppler sensor 10, the state of the switch sensor set in the state operation panel 40 are shown for each room which is an example of the compartment region. For example, as for the "room Y", the determination result of the state of a human being is the "resting" state, and the operation mode of the Doppler sensor 10 is the "normal mode", and the state of the switch sensor set in the state operation panel 40 is "present in room", and the determination result of the state of a human being matches the state of the switch sensor.

On the other hand, as for the "room X", the determination result of the state of a human being is the "empty" state, while the state of the switch sensor set in the state operation panel 40 is "present in room", and the determination result of the state of a human being does not match the state of the switch sensor. Like this, when the determination result of the state of a human being does not match the state of the switch sensor, it is possible that a trouble is occurring. For example, in the medical facility, it is possible that the patient has gone out of the room without permission, or that the patient has gone into a cardio-respiratory arrest state by sudden deterioration. For this reason, the display control section 250 highlights the display area for the "room X" as illustrated in FIG. 7, and superimposes the warning message of "trouble may be occurring in room X!" on the presence-in-room situation confirmation screen image. By such a configuration, the monitoring operator who utilizes the control server 20 can know the compartment region in which a trouble may be occurring.

<1-4. Operation of Control System According to First Embodiment>

In the above, each device for configuring the control system according to the first embodiment has been described. Subsequently, with reference to FIG. 8, the operation of the control system according to the first embodiment will be described.

Figure 8:
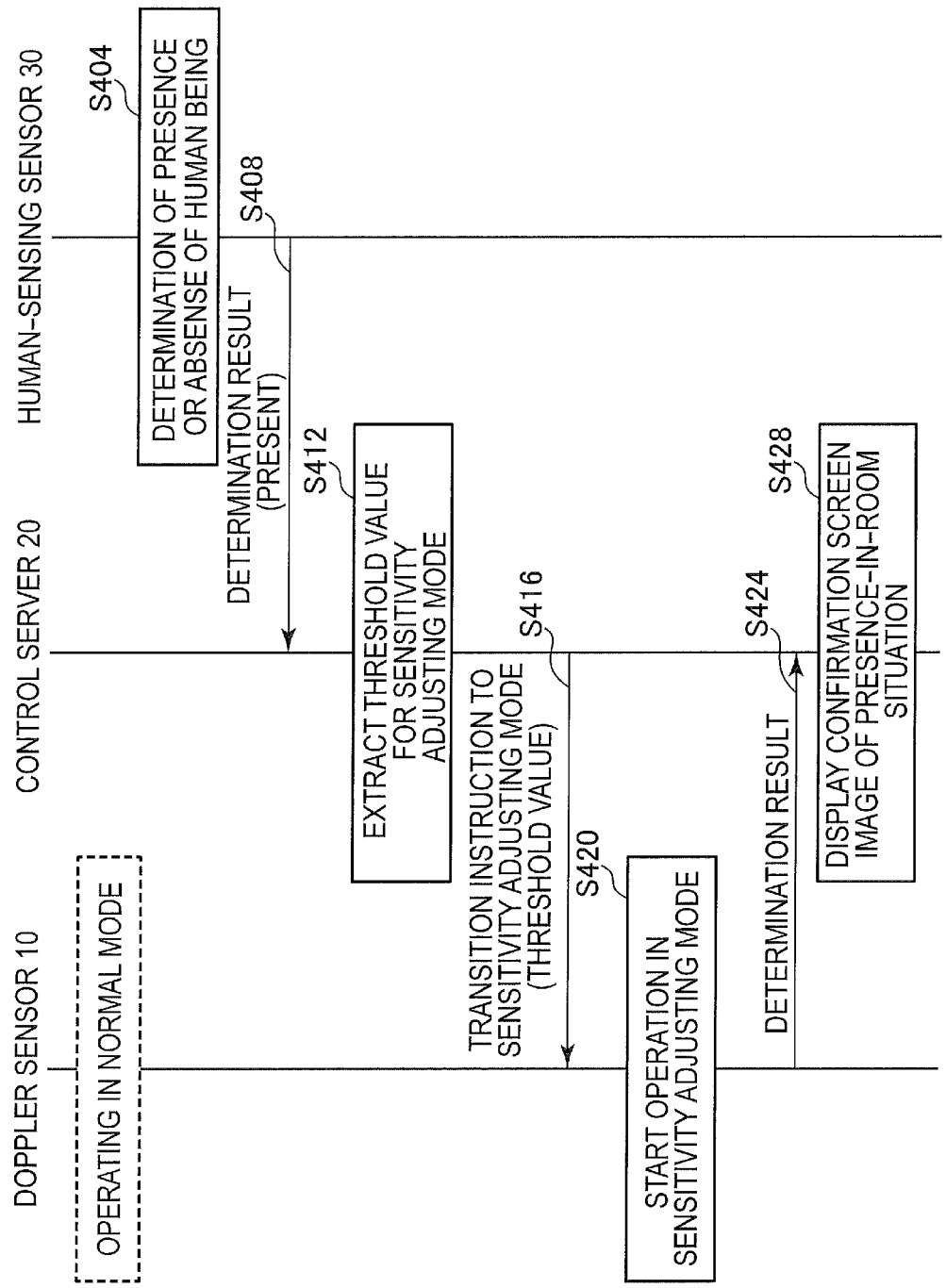
FIG. 8 is an explanatory diagram illustrating an operation of a control system according to a first embodiment.

FIG. 8 is an explanatory diagram illustrating the operation of the control system according to the first embodiment. As illustrated in FIG. 8, first, the human-sensing sensor 30 determines the presence or absence of a human being in the adjacent region of the compartment region in which the Doppler sensor 10 is provided (S404). Then, the human-sensing sensor 30 transmits, to the control server 20, the determination result of the presence or absence of a human being in the adjacent region (S408). Here, it is assumed that the determination result indicating that a human being is present in the adjacent region is obtained. Also, it is assumed that the Doppler sensor 10 is operated in the normal mode.

In this case, the mode control section 230 of the control server 20 extracts the threshold value for the sensitivity adjusting mode from the storage section 240 (S412). Then, the communication section 220 of the control server 20 transmits, to the Doppler sensor 10, the threshold value for the sensitivity adjusting mode, as the transition instruction to the sensitivity adjusting mode, in accordance with the control from the mode control section 230 (S416).

When the threshold value for the sensitivity adjusting mode is received by the communication section 132 of the Doppler sensor 10, the storage section 136 stores the threshold value for the sensitivity adjusting mode. Then, for the determination of the presence or absence and the state of a human being in a predetermined compartment region, the determination section 128 uses the threshold value for the sensitivity adjusting mode stored in the storage section 136, in order to start the operation in the sensitivity adjusting mode (S420).

Then, the communication section 132 transmits the determination result by the determination section 128 of the Doppler sensor 10 to the control server 20 (S424), and the display control section 250 of the control server 20 displays the presence-in-room situation confirmation screen image on the display section 260, using the determination result from the Doppler sensor 10 (S428). After that, the Doppler sensor 10 transmits the determination result to the control server 20 on a regular basis, and changes the operation mode into the normal mode in accordance with the transition instruction to the normal mode from the control server 20.

As described above, according to the first embodiment of the present invention, the operation mode of the Doppler sensor 10 provided in a predetermined compartment region is switched in response to the presence or absence of a human being in the adjacent region of the predetermined compartment region. Accordingly, regardless of the situation of the adjacent region, whether or not a human being is present in the predetermined compartment region is determined more accurately.

<1-5. Variant Example of Operation Mode>

In the above, as one example of the second operation mode in which the situation that results in the determination result indicating that a human being is present in the presence-or-absence determination by the Doppler sensor 10 is more limited than in the normal mode, description has been made of the sensitivity adjusting mode that changes the threshold value used in the determination by the determination section 128. However, the second operation mode is not limited to such an example. In the following, variant examples of the second operation mode will be described. Note that each variant example described below is applicable to the second embodiment described later in the same way.

(First Variant Example)

Figure 9:
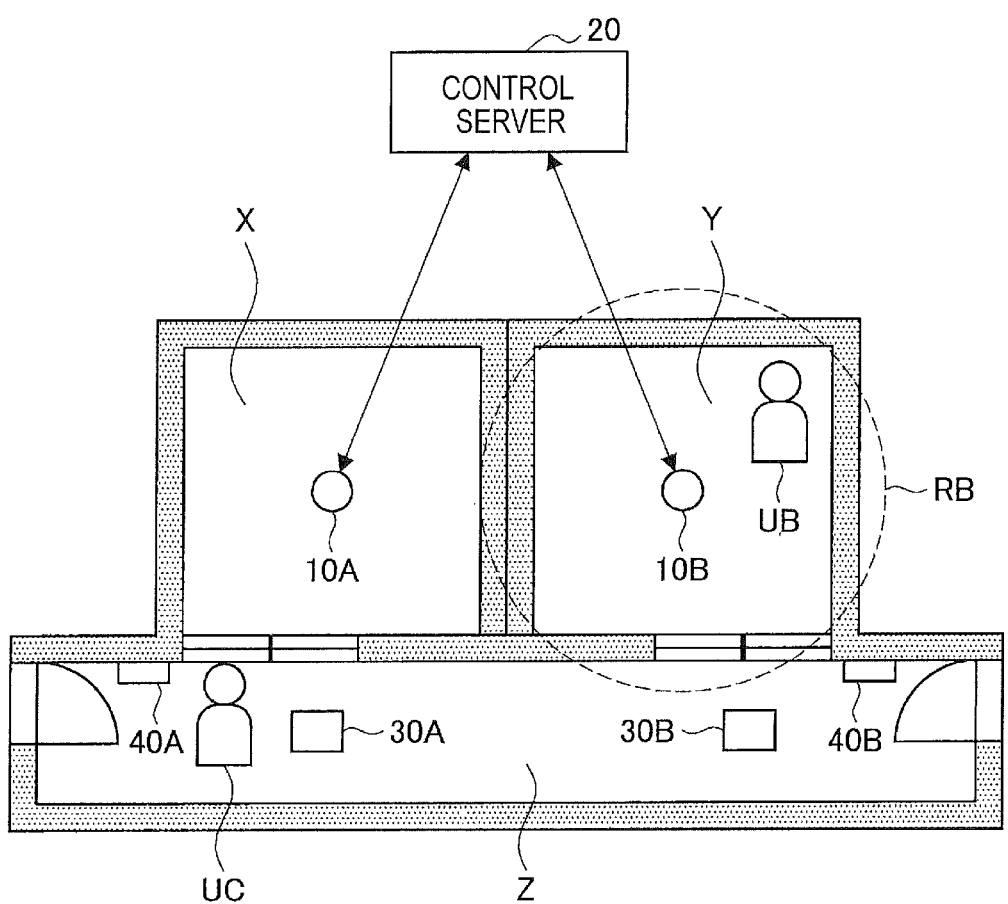
FIG. 9 is an explanatory diagram illustrating a first variant example of a first embodiment.

The Doppler sensor 10 according to the first variant example stops a process that is one of the transmission of the transmitted wave, the reception of the reflected wave, and the determination by the determination section 128, in accordance with the transition instruction to the second operation mode from the control server 20. For example, as illustrated in FIG. 9, the Doppler sensor 10A provided in the "room X" may stop the transmission of the transmitted wave in the second operation mode. According to such a configuration, when a human being is not present in the adjacent region of the "room X", the determination result indicating that a human being is present is prevented from being obtained, regardless of the presence or absence of a human being in the passageway Z adjacent to the "room X".

(Second Variant Example)

Figure 10:
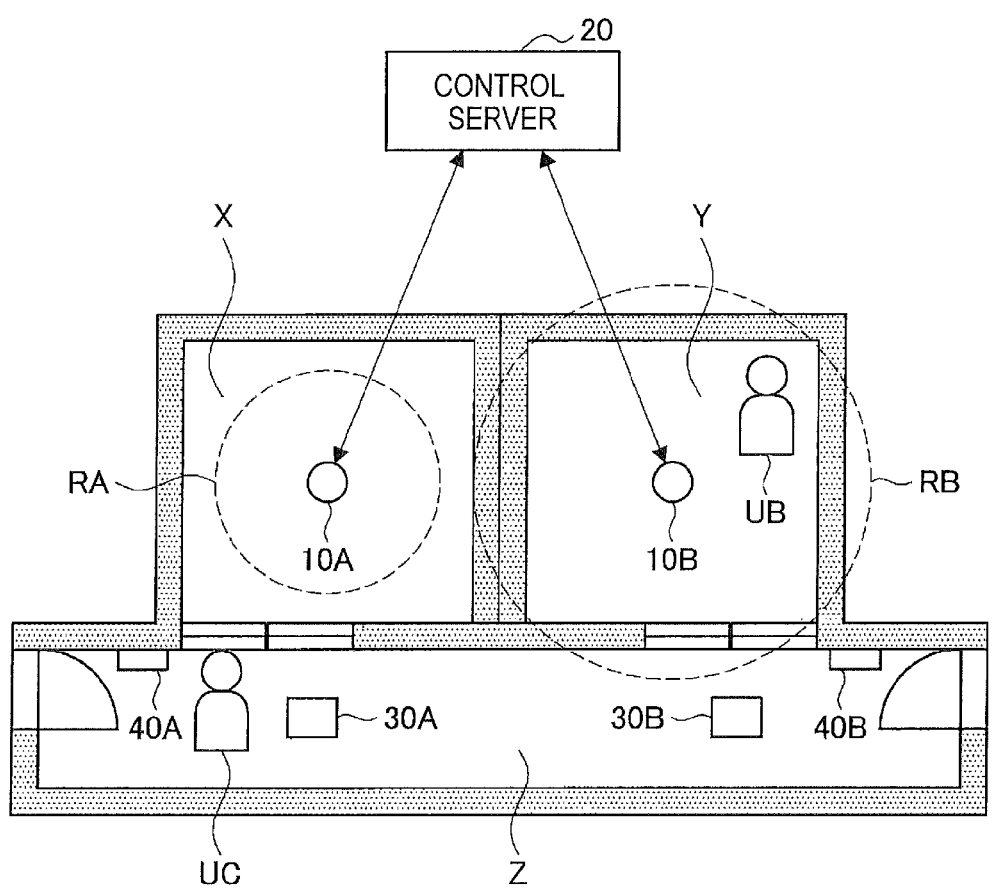
FIG. 10 is an explanatory diagram illustrating a second variant example of a first embodiment.

The Doppler sensor 10 according to the second variant example makes the scope RA of detection narrow in accordance with the transition instruction to the second operation mode from the control server 20. For example, as illustrated in FIG. 10, the Doppler sensor 10A provided in the "room X" may reduce the transmission power of the transmitted wave in the second operation mode. According to such a configuration, the influence of the presence or absence of a human being in the passageway Z adjacent to the "room X" on the determination conducted by the determination section 128 is reduced. Note that parameters of the transmission power may be stored in the Doppler sensor 10, or may be transmitted from the control server 20.

(Third Variant Example)

Figure 11:
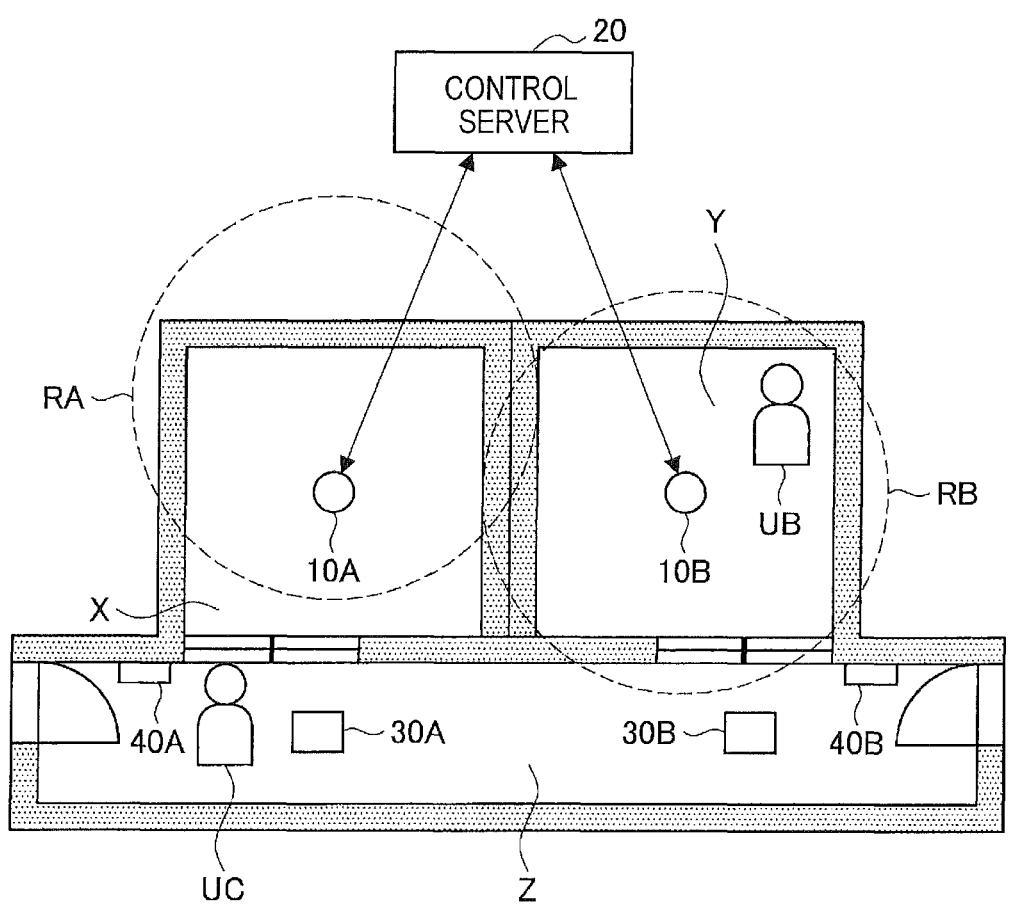
FIG. 11 is an explanatory diagram illustrating a third variant example of a first embodiment.

The Doppler sensor 10 according to the third variant example shifts the scope of detection in accordance with the transition instruction to the second operation mode from the control server 20. For example, as illustrated in FIG. 11, the Doppler sensor 10A provided in the "room X" may shift the scope RA of detection to the opposite side from the passageway Z adjacent to the "room X" in the second operation mode. By such a configuration as well, the influence of the presence or absence of a human being in the passageway Z adjacent to the "room X" on the determination conducted by the determination section 128 is reduced. Note that shifting the scope RA of detection is realized by a method to change mechanically the directions of the transmitter section 108 and the receiver section 112 by an actuator or the like, a method to give the directional characteristics to the transmission and reception by the transmitter section 108 and the receiver section 112, or the like.

<1-6. Variant Example of Presence-or-Absence Determination of Adjacent Region>

In the above, description has been made of the example in which the determination on whether or not a human being is present in the adjacent region is conducted with the human-sensing sensor 30 such as an infrared sensor, an ultrasonic sensor, or a visible light sensor. However, the determination method on whether or not a human being is present in the adjacent region is not limited to such an example.

For example, the image pickup device including the image sensor for capturing an image of the adjacent region is installed, and the image pickup device may determine whether or not a human being is present, by analyzing the image obtained by the image sensor.

Also, when there is a human being who in turn patrols each compartment region, and the patrol schedule of the human being is set beforehand, the control server 20 may determine whether or not a human being is present in the adjacent region on the basis of the patrol schedule. For example, when the patrol schedule "9:10 to 9:15: 'room X', 'room Y'" is set, the control server 20 may determine that a human being is present in the adjacent region Z during the period from 9:10 to 9:15.

Also, the control server 20 may acquire the state information set by a human for each compartment region and transmitted from the state operation panel 40, as a determination result of whether or not a human being is present in the adjacent region. For example, when the state information transmitted from the state operation panel 40 is the state indicating the presence of the third person, like "in meeting" and "having a visitor", the control server 20 may determine that a human being is present in the adjacent region.

<1-7. Supplement>

Note that, in the above, description has been made of the example in which the control server 20 including the mode control section 230 that conducts the switching control of the operation mode, but the mode control section 230 may be provided in the Doppler sensor 10. In other words, the Doppler sensor 10 may receive the determination result by the human-sensing sensor 30, and switch the operation mode on the basis of the determination result by the human-sensing sensor 30.

Also, in the above, description has been made of the example in which the Doppler sensor 10 is provided with the determination section 128 that determines the presence or absence of a human being in a predetermined compartment region, but the determination section 128 may be provided in the control server 20. In other words, the control server 20 may receive the Doppler signal or the feature value from the Doppler sensor 10, and determine the presence or absence of a human being in a predetermined compartment region on the basis of the Doppler signal or the feature value.

2. Second Embodiment

Subsequently, the second embodiment of the present invention will be described. The second embodiment of the present invention is mainly different from the first embodiment in that a plurality of Doppler sensors are provided in one compartment region.

<2-1. Overview of Control System According to Second Embodiment>

Figure 12:
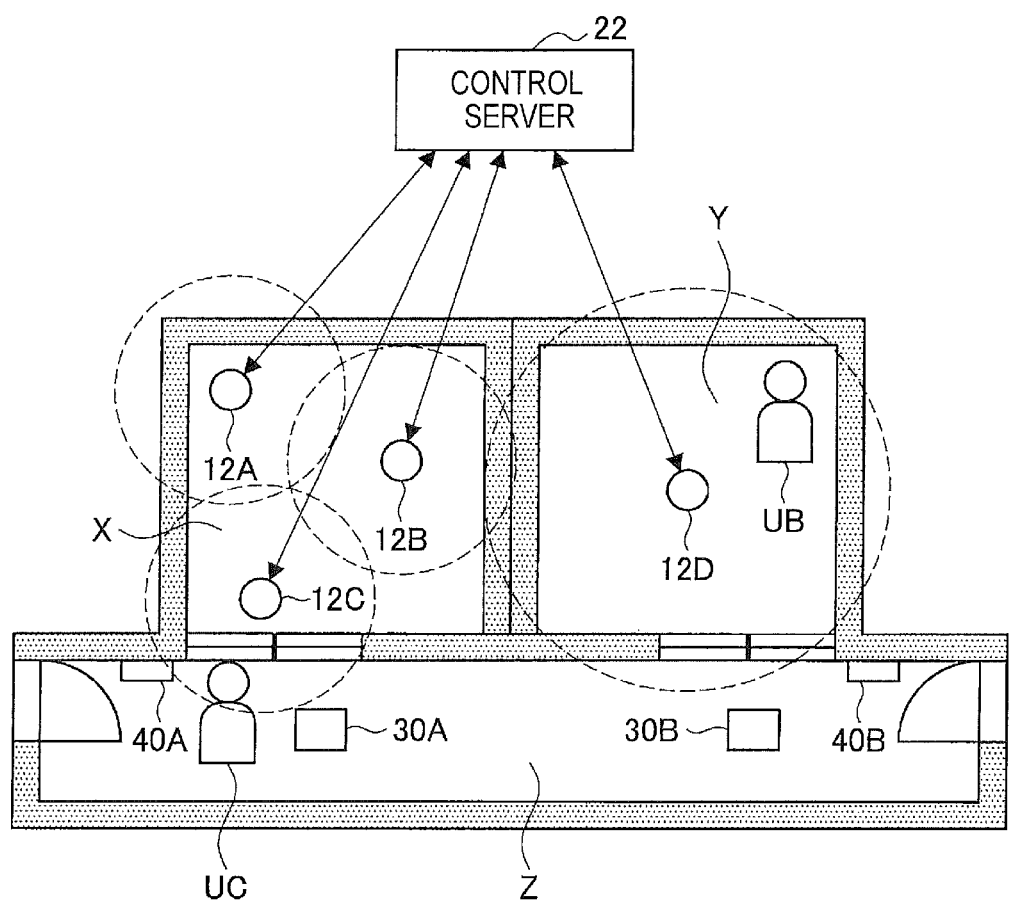
FIG. 12 is an explanatory diagram illustrating a basic configuration of a control system according to a second embodiment of the present invention.

FIG. 12 is an explanatory diagram illustrating the basic configuration of the control system according to the second embodiment of the present invention. As illustrated in FIG.

12, the control system according to the second embodiment of the present invention includes Doppler sensors 12A to 12D, a control server 22, human-sensing sensors 30A and 30B, and state operation panels 40A and 40B. Since the human-sensing sensor 30 and the state operation panel 40 is as described in the first embodiment, the detailed description is omitted here.

In the second embodiment of the present invention, a plurality of Doppler sensors 12 can be provided in one compartment region. For example, as illustrated in FIG. 12, the Doppler sensors 12A, 12B and 12C are provided in the "room X". As described in the first embodiment, each Doppler sensor 12 transmits light, electromagnetic wave, sound wave, or the like, as a transmitted wave, and receives a reflected wave from a moving object that is present in the scope of detection, and determines the presence or absence of a moving object and the state of a moving object on the basis of the result of the reception. Then, each Doppler sensor 12 transmits the determination result to the control server 22. Note that, in the second embodiment, the switching control of the operation mode of the Doppler sensor 12 according to the determination result of the human-sensing sensor 30 is not conducted.

The control server 22 is an example of the control device for controlling the operation of the control system according to the present embodiment. The control server 22 controls the operation mode on the basis of the determination result received from the human-sensing sensor 30 and indicating the presence or absence of a human being in the adjacent region, and determines the presence or absence and the situation of a human being in a predetermined compartment region on the basis of the individual determination result received from each Doppler sensor 12.

For example, in the example illustrated in FIG. 12, the control server 22 operates in the normal mode (the first operation mode) when receiving the determination result indicating that a human being is not present in the "passageway Z" from the human-sensing sensor 30A, and operates in the sensitivity adjusting mode (the second operation mode) when receiving the determination result indicating that a human being is present in the "passageway Z" from the human-sensing sensor 30A. Here, the situation that results in the determination result indicating that a human being is present in a predetermined compartment region in the presence-or-absence determination of a human being is more limited in the sensitivity adjusting mode, than in the normal mode. By such a configuration, for example as illustrated in FIG. 12, in the situation in which the "room X" is empty and the human being UC is present in front of the "room X", the control server 22 operates in the sensitivity adjusting mode, in order to reduce the cases in which the determination result indicating that a human being is present is obtained by mistake.

<2-2. Configuration of Control Server According to Second Embodiment>

In the above, the overview of the control system according to the second embodiment has been described. Subsequently, with reference to FIG. 13, the configuration of the control server 22 according to the second embodiment will be described.

Figure 13:
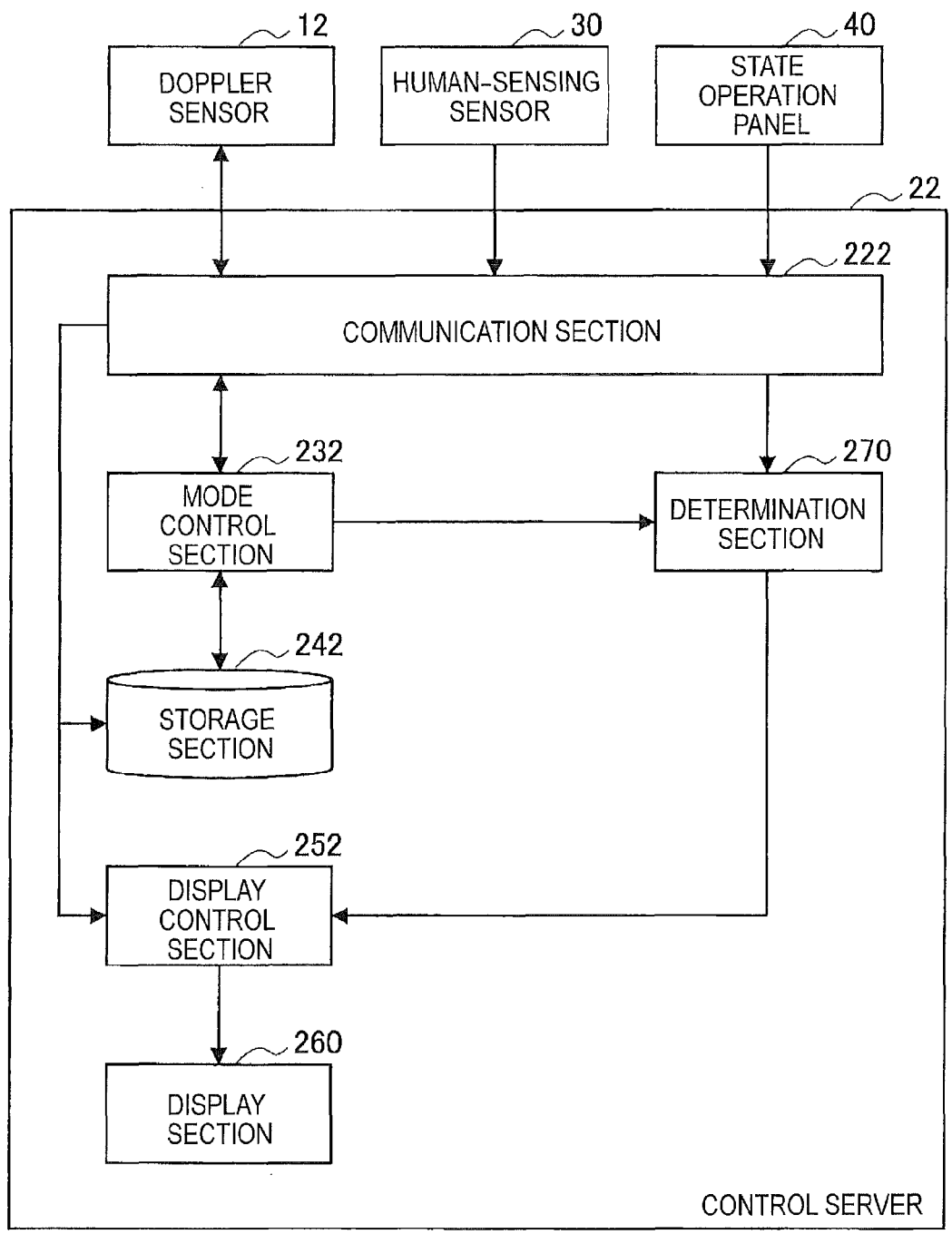
FIG. 13 is a functional block diagram illustrating a configuration of a control server 22 according to a second embodiment.

FIG. 13 is a functional block diagram illustrating the configuration of the control server 22 according to the second embodiment. As illustrated in FIG. 13, the control server 22 according to the second embodiment includes a communication section 222, a mode control section 232, a storage section 242, a display control section 252, a display section 260 and a determination section 270.

(Communication Section)

The communication section 222 transmits to and receives from the Doppler sensor 12, the human-sensing sensor 30 and the state operation panel 40, various types of information. For example, the communication section 222 receives the determination result of the presence or absence of a human being in the adjacent region of a predetermined compartment region provided with the Doppler sensor 10. Also, specifically, the communication section 222 receives the individual determination results from a plurality of Doppler sensors 12 provided in the same compartment region. Note that the communication between the communication section 222 and each Doppler sensor 12, the human-sensing sensor 30, and the state operation panel 40 may be conducted through a wire, or may be conducted wirelessly, or may be conducted through a network.

(Determination Section)

The determination section 270 determines the presence or absence and the situation of a human being in a predetermined compartment region on the basis of the individual determination results received from the plurality of Doppler sensors 12 by the communication section 222. For example, the determination section 270 determines the presence or absence and the situation of a human being in the "room X" on the basis of the individual determination results received from the Doppler sensors 12A, 12B and 12C provided in the "room X" illustrated in FIG. 12. The method of the determination by this determination section 270 will be described later in detail for each operation mode with reference to FIG. 14.

(Mode Control Section)

The mode control section 232 controls the operation mode of the determination section 270 on the basis of the determination result for the adjacent region received from the human-sensing sensor 30 by the communication section 222. For example, the mode control section 232 operates the determination section 270 in the normal mode, when receiving the determination result indicating that a human being is not present in the "passageway Z" from the human-sensing sensor 30A illustrated in FIG. 12. On the other hand, the mode control section 232 operates the determination section 270 in the sensitivity adjusting mode, when receiving the determination result indicating that a human being is present in the "passageway Z" from the human-sensing sensor 30A. Here, in the normal mode and the sensitivity adjusting mode, the weights given to the individual determination results received from respective Doppler sensor 12 are different from each other. In the following, with reference to FIG. 14, more specific description will be made.

FIG. 14 is an explanatory diagram illustrating an example of the normal mode and the sensitivity adjusting mode. In the normal mode, the individual determination result by each Doppler sensor 12 is treated with an equal weight. For example, when the determination results by the Doppler sensors 12A and 12B are the "empty" state, and the determination result by the Doppler sensor 12C is the "acting" state as illustrated in FIG. 14, the weight "1" is given to each determination result and added to make an empty score "2", and an acting score "1".

Here, the determination section 270 conducts the determination by the below criteria in each operation mode.
  acting score<1 and resting score<1
  determination result: "empty" state
  acting score≥1 or resting score≥1
  determination result: state having a higher score among "acting" and "resting"

If the determination criteria are applied to the example illustrated in FIG. 14, the empty score is "2", and the acting score is "1". Because "acting score 1" is satisfied, the determination section 270 operating in the normal mode determines that the state of a human being in the "room X" is the "acting" state.

On the other hand, in the sensitivity adjusting mode, a low weight is given to the determination result of the Doppler sensor 12 positioned adjacent to the adjacent region. For example, as illustrated in FIG. 14, the weight "1" is given to the Doppler sensor 12A, and the weight "0.8" is given to the Doppler sensor 12B, and the weight "0.3" is given to the Doppler sensor 12C. In this case, when the determination results by the Doppler sensors 12A and 12B are the "empty" state and the determination result by the Doppler sensor 12C is the "acting" state as illustrated in FIG. 14, the empty score is "1.8" and the acting score is "0.3" as opposed to the normal mode. If the above determination criteria are applied to this example, because "acting score<1 and resting score<1" is satisfied, the determination section 270 operating in the sensitivity adjusting mode determines that the state of a human being in the "room X" is the "empty" state.

As described above, the mode control section 232 outputs, to the determination section 270, the weight given to the individual determination result by each Doppler sensor 12, as the transition instruction of the operation mode, in order to control the operation mode of the determination section 270. Also, the control of the operation mode by the mode control section 232 enables correct determination of the presence or absence and the state of a human being in a predetermined compartment region.

(Storage Section)

The storage section 242 stores various types of information used in the operation of the control server 22. For example, the storage section 242 may store the weight for the normal mode, and the weight for the sensitivity adjusting mode, for each Doppler sensor 12.

(Display Control Section, Display Section)

The display control section 252 controls the display displayed by the display section 260. For example, the display control section 252 generates a presence-in-room situation confirmation screen image indicating the presence-in-room situation of each compartment region on the basis of the determination result by the determination section 270, and causes the display section 260 to display the presence-in-room situation confirmation screen image. Since the presence-in-room situation confirmation screen image is as described with reference to FIG. 7, the detailed description is omitted here.

As described above, in the second embodiment of the present invention, different weights according to the operation mode are given to the individual determination results by a plurality of Doppler sensors 12 provided in one compartment region, in order to correctly determine the presence or absence and the state of a human being in the compartment region.

3. Hardware Configuration

The information process such as the control of the operation mode and the presence-or-absence determination of a human being according to each embodiment of the present invention described above is realized by the cooperation between the software and the hardware of the control server 20 (22) described below.

Figure 15:
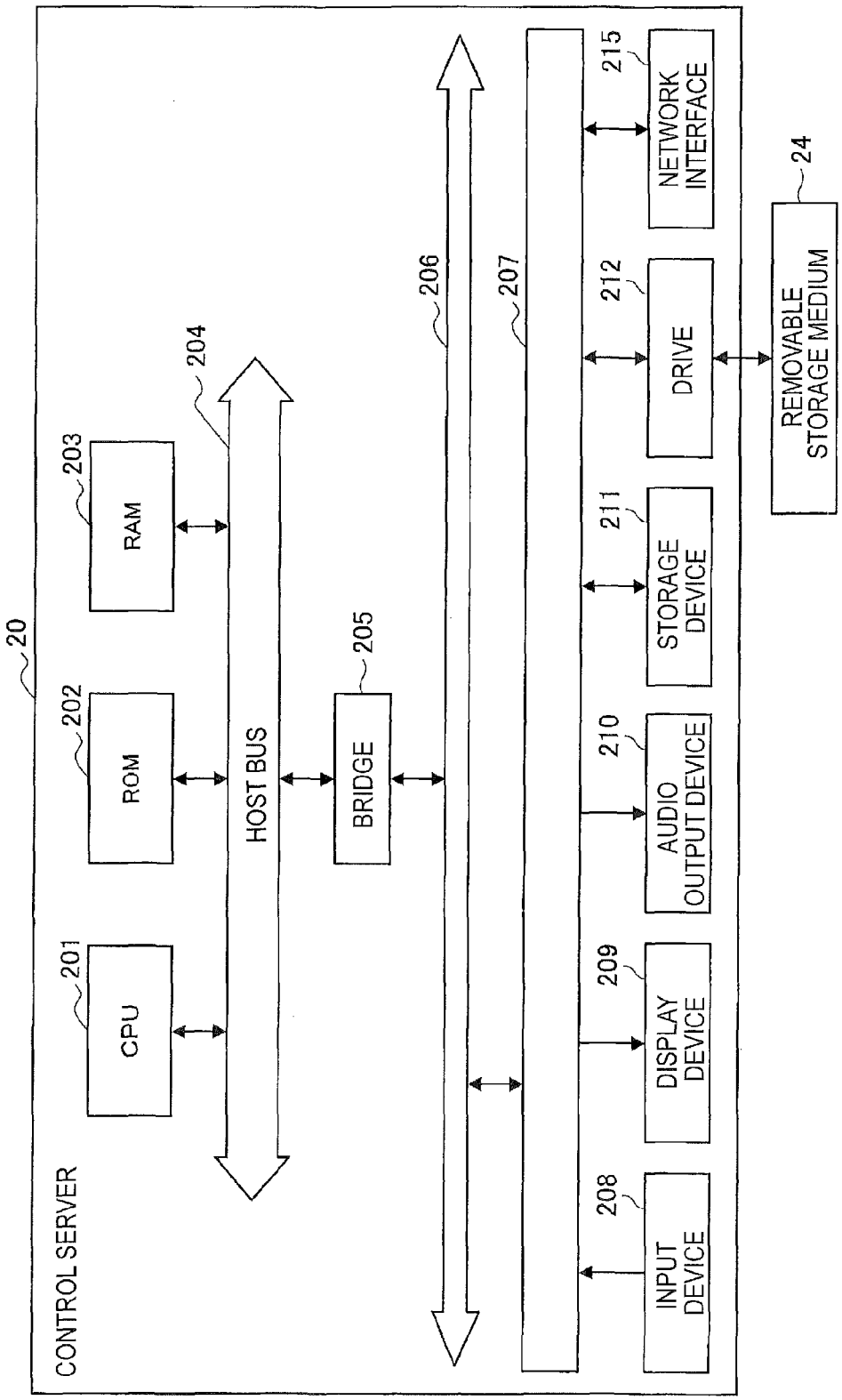
FIG. 15 is a block diagram illustrating a hardware configuration of a control server 20.

FIG. 15 is a block diagram illustrating the hardware configuration of the control server 20. The control server 20 includes a CPU (Central Processing Unit) 201, a ROM (Read Only Memory) 202, a RAM (Random Access Memory) 203, and a host bus 204. Also, the control server 20 includes a bridge 205, an external bus 206, an interface 207, an input device 208, a display device 209, an audio output device 210, a storage device (HDD) 211, a drive 212, and a network interface 215.

The CPU 201 serves as an arithmetic processing device and a control device, and controls the general operation in the control server 20 in accordance with various types of programs. Also, the CPU 201 may be a microprocessor. By this CPU 201, the function such as the mode control section 230 and the display control section 250 described above are implemented. The ROM 202 stores programs, operation parameters, and others used by the CPU 201. The RAM 203 temporarily stores the programs used in the execution of the CPU 201, the parameters that vary as appropriate in the execution, and others. These are connected to each other by the host bus 204 configured by a CPU bus and the like.

The host bus 204 connected to the external bus 206 such as a PCI (Peripheral Component Interconnect/Interface) bus via the bridge 205. Note that the host bus 204, the bridge 205, and the external bus 206 are not necessarily configured separately, but these function may be implemented in one bus.

The input device 208 includes input means for the user to input information, such as a mouse, a keyboard, a touch panel, a button, a microphone, a switch, a lever, and the like, the input control circuit that generates an input signal on the basis of the input by the user and outputs it to the CPU 201, and the like. The user of the control server 20 can input the various types of data to the control server 20, and instruct the processing operation, by manipulating the input device 208.

The display device 209 includes a display device such as a CRT (Cathode Ray Tube) display device, a liquid crystal display (LCD) device, an OLED (Organic Light Emitting Diode) device, a lamp, and the like, for example. Also, the audio output device 210 includes an audio output device such as a speaker and a headphone.

The storage device 211 is a device for data storage, which is configured as one example of the storage section of the control server 20 according to the present embodiment. The storage device 211 may include a storage medium, a recording device that records data in the storage medium, a reading device that reads data from the storage medium, a deleting device that deletes data recorded in the storage medium, and others. The storage device 211 includes a hard disk drive (HDD), for example. This storage device 211 drives the hard disk, and stores programs executed by the CPU 201 and various types of data.

The drive 212 is a storage medium reader/writer, and is built in the control server 20 or provided externally. The drive 212 reads information recorded in the removable storage medium 24 such as a magnetic disk, an optical disc, a magneto-optical disk, or a semiconductor memory which is set, and outputs it to the RAM 203. Also, the drive 212 can write information into the removable storage medium 24 as well.

The network interface 215 is a communication interface including a communication device or the like for connecting to the network, for example. Also, the network interface 215 may be a wireless LAN (Local Area Network) compatible communication device, or may be a wire communication device that executes communication through a wire.

Although the hardware of the control server 20 has been described above, the Doppler sensor 10 also includes the hardware corresponding to the CPU 201, the ROM 202, the RAM 203, and others, and the functions such as the feature value extracting section 124 and the determination section 128 may be implemented by the cooperation between these hardware and software.

4. Closing Remarks

As described above, the control server 20 controls the detection by the Doppler sensor 10, or the operation mode for the presence-or-absence determination of a human being in the compartment region in which the Doppler sensor 10 is provided, on the basis of the determination result received from the human-sensing sensor 30 of the adjacent region of the above compartment region. In other words, the presence-or-absence determination of a human being in the compartment region in which the Doppler sensor 10 is provided is conducted with consideration of the presence or absence of a human being in the adjacent region, in order to improve the accuracy of the above presence-or-absence determination.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, each step in the process of the Doppler sensor 10 and the control server 20 of the present specification is not necessarily processed in sequence in the order described in the sequence diagram. For example, each step in the process of the Doppler sensor 10 and the control server 20 may be processed in a different order from the order described in the sequence diagram, or processed in parallel.

Also, the computer program for causing the hardware such as the CPU 201, the ROM 202 and the RAM 203 built in the Doppler sensor 10 and the control server 20 to exercise the function equivalent to each configuration of the Doppler sensor 10 and the control server 20 described above can be made as well. Also, the storage medium storing the computer program is also provided.

Further, the sensor used in the determination of the presence or absence of a moving object in the compartment region is not limited to the Doppler sensor. In the utility form in which the presence or absence of a moving object in the adjacent region affects the determination accuracy when the attachment position and the sensitivity are adjusted to conduct determination in the entire compartment region, the present technology can be applied to a system using an infrared sensor, an ultrasonic sensor, or a visible light sensor other than the Doppler sensor.

What is claimed is:

1. A control device for use in a system configured to conduct presence-or-absence determination on whether or not a moving object is present on the basis of detection by a first sensor provided in a predetermined compartment region, the control device comprising:
    a mode control section configured to control switching of an operation mode for the detection by the first sensor or the presence-or-absence determination; and
    an acquisition section configured to acquire a determination result of whether or not a moving object is present in an adjacent region adjacent to the predetermined compartment region and not including the predetermined compartment region,
    wherein the mode control section switches the operation mode to a first operation mode when a determination result indicating that a moving object is not present in the adjacent region is acquired by the acquisition section, and switches the operation mode to a second operation mode when a determination result indicating that a moving object is present in the adjacent region is acquired, and
    wherein switching the operation mode to the second operation mode includes changing a detection range of the first sensor such that a likelihood of detecting a presence of a moving object in the predetermined compartment region by the first sensor is reduced, and
    the acquisition section determines whether or not a moving object is present in the adjacent region on the basis of a detection result by a second sensor of which an area of detection includes the adjacent region.

2. The control device according to claim 1, wherein the first sensor is a Doppler sensor configured to generate a Doppler signal on the basis of a transmitted wave and a received wave including a reflected wave of the transmitted wave.

3. The control device according to claim 1, wherein the detection by the first sensor is stopped in the second operation mode based on the determination result that the moving object is present in the adjacent region, and the detection by the first sensor is started based on the mode control section switching from the second mode to the first mode based on the determination result that the moving object is not present in the adjacent region.

4. The control device according to claim 1, wherein a scope of detection by the first sensor is reduced in the second operation mode, and
    wherein reducing the scope of detection includes reducing an area of detection of the first sensor.

5. The control device according to claim 1, wherein in the second operation mode, a direction of detection by the first sensor is changed to an opposite side from the adjacent region.

6. The control device according to claim 1, wherein the presence-or-absence determination is conducted by comparing a value obtained on the basis of the detection by the first sensor and a threshold value, and
    a different value is applied as the threshold value in the first operation mode from in the second operation mode.

7. The control device according to claim 1, wherein a plurality of first sensors are provided in the predetermined compartment region, and
    the control device further comprises a determination section configured to determine whether or not a moving object is present on the basis of the detection by the first sensors, and
    the determination section conducts determination on whether or not a moving object is present by using each detection by the first sensors with a weight according to the determination result acquired by the acquisition section.

8. The control device according to claim 1, wherein the second sensor is a human-sensing sensor.

9. The control device according to claim 1, wherein the second sensor is an image sensor.

10. The control device according to claim 1, wherein the second sensor is a human-operated switch sensor provided for the predetermined compartment region.

11. The control device according to claim 1, wherein the acquisition section identifies whether or not the moving object is a human being based on a preset patrol schedule of a human being in the predetermined compartment region.

12. The control device according to claim 1, further comprising
a display control section configured to cause a display section to display a determination result of whether or not a moving object is present, obtained on the basis of the detection by the first sensor.

13. The control device according to claim 12, wherein
the display control section causes the display section to further display information indicating in which operation mode the determination result based on the detection by the first sensor is obtained.

14. The control device according to claim 1, further comprising
a storage section configured to store a history of the determination result based on the detection by the first sensor.

15. The control device according to claim 1, wherein
the moving object is a human being.

16. A control system configured to conduct presence-or-absence determination on whether or not a moving object is present on the basis of detection by a first sensor provided in a predetermined compartment region, the control system comprising:
the first sensor;
a second sensor of which a scope of detection includes an adjacent region adjacent to the predetermined compartment region and not including the predetermined compartment region; and
a control device including
a mode control section configured to control switching of an operation mode for the detection by the first sensor or the presence-or-absence determination, and
an acquisition section configured to acquire a determination result of whether or not a moving object is present in the adjacent region on the basis of communication with the second sensor,
wherein the mode control section switches the operation mode to a first operation mode when a determination result indicating that a moving object is not present in the adjacent region is acquired by the acquisition section, and switches the operation mode to a second operation mode when a determination result indicating that a moving object is present in the adjacent region is acquired, and
wherein switching the operation mode to the second operation mode includes changing a detection range of the first sensor such that a likelihood of detecting a presence of a moving object in the predetermined compartment region by the first sensor is reduced.

17. A control device for use in a system configured to conduct presence-or-absence determination on whether or not a moving object is present on the basis of detection by a first sensor provided in a predetermined compartment region, the control device comprising:
a mode control section configured to control switching of an operation mode for the detection by the first sensor or the presence-or-absence determination; and
an acquisition section configured to acquire a determination result of whether or not a moving object is present in an adjacent region adjacent to the predetermined compartment region and not including the predetermined compartment region,
wherein the mode control section switches the operation mode to a first operation mode when a determination result indicating that a moving object is not present in the adjacent region is acquired by the acquisition section, and switches the operation mode to a second operation mode when a determination result indicating that a moving object is present in the adjacent region is acquired, and
wherein switching the operation mode to the second operation mode includes changing a detection range of the first sensor such that a likelihood of detecting a presence of a moving object in the predetermined compartment region by the first sensor is reduced,
the acquisition section is configured to acquire the determination that a moving object is present in the adjacent region based on determining that a human being is scheduled to be in the adjacent region according to a preset patrol schedule.

18. The control device according to claim 1, wherein a scope of detection by the first sensor is reduced in the second operation mode, and
wherein reducing the scope of detection includes reducing a sensitivity of the first sensor.

* * * * *